(12) United States Patent
DeJong et al.

(10) Patent No.: US 12,353,550 B2
(45) Date of Patent: Jul. 8, 2025

(54) SNAPSHOT-BASED BOOT VOLUME FOR RELIABLE SERVER MANAGEMENT AND IMMUTABLE REBOOT PROCESSES IN STORAGE PROCESSING UNITS

(71) Applicant: NVIDIA CORPORATION, Santa Clara, CA (US)

(72) Inventors: David DeJong, Fremont, CA (US); Tobias Flitsch, San Jose, CA (US); Siamak Nazari, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 131 days.

(21) Appl. No.: 18/115,260

(22) Filed: Feb. 28, 2023

(65) Prior Publication Data

US 2023/0273799 A1   Aug. 31, 2023

Related U.S. Application Data

(60) Provisional application No. 63/314,970, filed on Feb. 28, 2022, provisional application No. 63/314,987, filed on Feb. 28, 2022, provisional application No. 63/314,996, filed on Feb. 28, 2022, provisional application No. 63/316,081, filed on Mar. 3, 2022.

(51) Int. Cl.
*G06F 9/4401* (2018.01)
*G06F 11/14* (2006.01)
*G06F 21/56* (2013.01)

(52) U.S. Cl.
CPC .......... *G06F 21/566* (2013.01); *G06F 9/4403* (2013.01); *G06F 9/4416* (2013.01); *G06F 11/1446* (2013.01); *G06F 2221/033* (2013.01)

(58) Field of Classification Search
CPC .... G06F 9/44516; G06F 9/4403; G06F 9/445; G06F 9/4451; G06F 9/44578; G06F 9/44505

See application file for complete search history.

(56) References Cited

U.S. PATENT DOCUMENTS 11,620,070 B2 * 4/2023 Balasubramanian ........................ G06F 16/2379 711/162
2011/0078433 A1 * 3/2011 Bert ...................... G06F 9/4411 713/2

(Continued)

FOREIGN PATENT DOCUMENTS

WO   2021150576 A1   7/2021
WO   2021174063 A1   9/2021

(Continued)

*Primary Examiner* — Raymond N Phan
(74) *Attorney, Agent, or Firm* — Hogan Lovells US LLP

(57) ABSTRACT

A storage processing unit (SPU), which may be resident in a server in a storage system, provides a boot volume to the server and provides storage services. The SPU may execute a process including taking three snapshots of the boot volume respectively after writing an operating system image into the boot volume, after writing component images or otherwise customizing contents of the boot volume, and after the server boots from the boot volume. For updates, stability, or recovery of the storage system, the SPU may promote any of the snapshots to be the boot volume before the server reboots.

13 Claims, 4 Drawing Sheets

(56) References Cited

U.S. PATENT DOCUMENTS

| | | | |
|---|---|---|---|
| 2011/0238969 A1* | 9/2011 | Warkentin | G06F 9/441 |
| | | | 713/1 |
| 2013/0262800 A1* | 10/2013 | Goodman | G06F 3/0647 |
| | | | 711/E12.002 |
| 2014/0149696 A1* | 5/2014 | Frenkel | G06F 11/1451 |
| | | | 711/162 |
| 2017/0024224 A1* | 1/2017 | Bakke | G06F 9/4416 |
| 2018/0276002 A1* | 9/2018 | Roszak | G06F 9/4416 |
| 2023/0033667 A1* | 2/2023 | Koteshwara | G06F 9/4411 |

FOREIGN PATENT DOCUMENTS

| | | |
|---|---|---|
| WO | 2021174070 A1 | 9/2021 |
| WO | 2022132957 A1 | 6/2022 |

* cited by examiner

SNAPSHOT-BASED BOOT VOLUME FOR RELIABLE SERVER MANAGEMENT AND IMMUTABLE REBOOT PROCESSES IN STORAGE PROCESSING UNITS

CROSS-REFERENCE TO RELATED APPLICATIONS

This patent document is a claims benefit of the earlier filing date of U.S. provisional Pat. App. No. 63/314,970, filed Feb. 28, 2022, U.S. provisional Pat. App. No. 63/314,987, filed Feb. 28, 2022, U.S. provisional Pat. App. No. 63/314,996, filed Feb. 28, 2022, and U.S. provisional Pat. App. No. 63/316,081, filed Mar. 3, 2022, all of which are hereby incorporated by reference in their entirety.

BACKGROUND

Enterprises often require storage systems that provide centralized data storage with systemwide management, protection, and sharing of data throughout the enterprises. The implementation of enterprise storage for a particular enterprise generally depends on the hardware, e.g., the servers and storage devices, that the enterprise has and on the needs of the enterprise. These enterprise-dependent factors can make configuration, maintenance, and operation of cluster enterprise storage complex and time consuming. Many enterprises, therefore, must employ experts to setup or maintain their storage systems.

A primary setup task is population of boot volumes for the servers of the storage system. (A boot volume is a portion of storage that must exist and be properly configured for a computing system such as a server to operate.) Each server in a storage system generally requires a boot volume containing an operating system and components that allow the server to startup and function properly, and the contents of the boot volume depend on hardware specifications of the server, the applications the server runs, and the number, types, and sizes of storage volumes that the server needs. More specifically, the contents of the boot volume for a server may depend on the operating system, BIOS, motherboard, add-in devices or cards, and other hardware components or peripherals (e.g., hard drives and other physical storage devices) of the server and storage requirements such as the number, types, and sizes of storage volumes that the server needs to provide for the applications of the enterprise.

Boot volumes not only need to be set up properly but may also need to be reliably customized or updated for hardware or software components of the servers. Frequently updates or other changes to a boot volume can create or expose incompatibility or improper configuration that may make a server inoperable or unreliable for the desired tasks. Unintended or malicious corruption of boot volumes is another cause of similar problems in storage system servers. For these reasons, systems and methods are needed that can more easily and reliably set up, configure, and maintain boot volumes for servers in storage systems.

BRIEF DESCRIPTION OF THE DRAWINGS

Use of the same reference symbols in different figures indicates similar or identical items.

DETAILED DESCRIPTION

Figure 1:
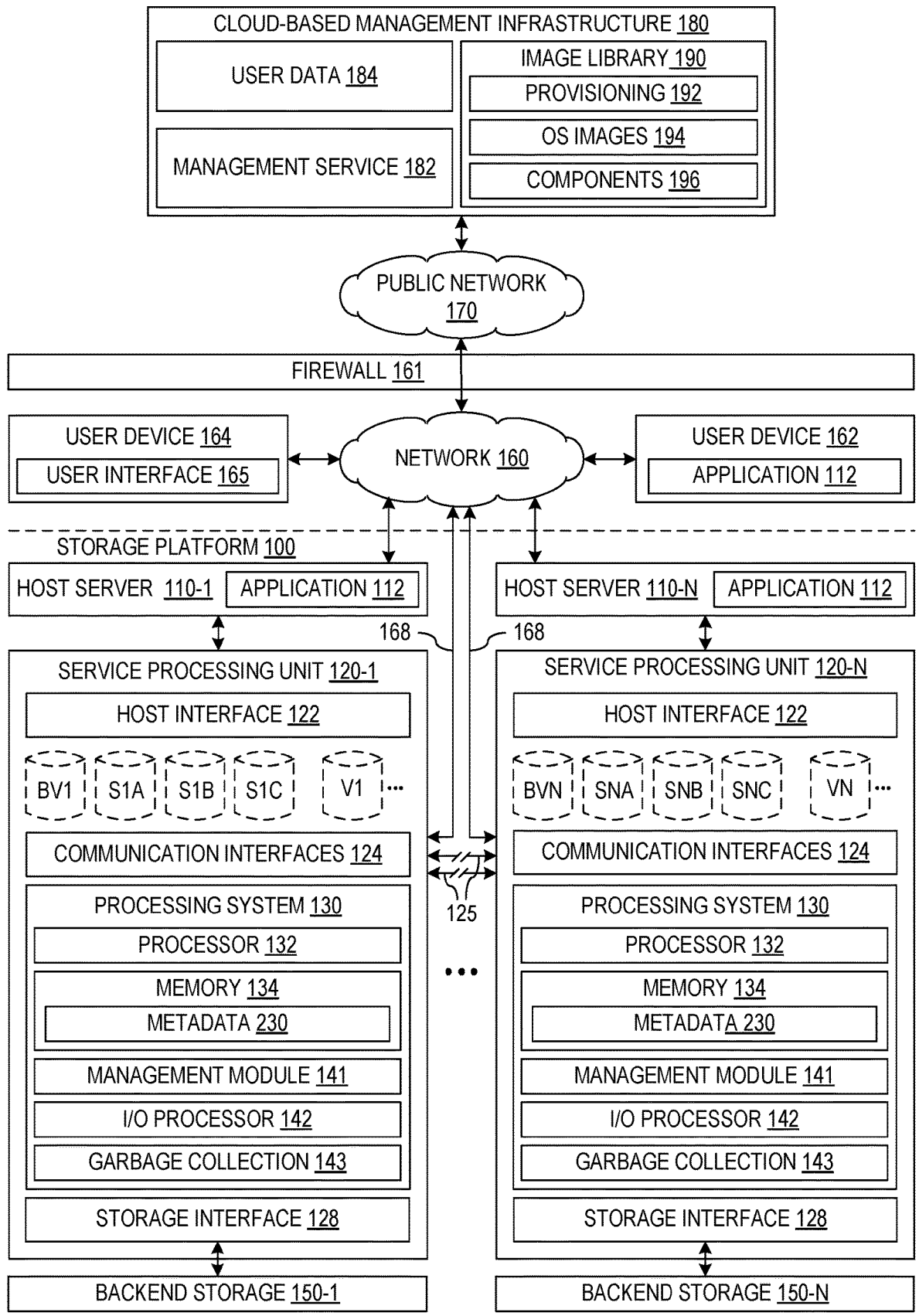
FIG. 1 is a block diagram illustrating an architecture including a storage platform with cloud-based management in accordance with one example of the present disclosure.

In accordance with an aspect of the current disclosure, a storage system can take, retain, and use snapshots of boot volumes taken during specific milestones in a process of booting up a server. In one example, a "host server" uses one or more storage processing units to implement one or more storage nodes of the storage system, and one of the storage processing units is configured to provide the boot volume for the host server. The storage processing unit providing the boot volume can use the different types of snapshots, when needed or in response to user instructions, to roll back the boot volume to a desired stable or operable version or to provide a known or consistent state of the host server each time the host server reboots.

A storage system in accordance with one example of the present disclosure may take and retain a first type (point A) snapshot of a boot volume after downloading a base boot image, e.g., an operating system image, and writing the base boot image to the boot volume. The base boot image may, for example, be downloaded from a cloud-based service when initializing a host server that requires the boot volume. International Pub. No. WO 2021/174070, entitled "Automatic Population of Boot Volumes via Provided URLs" discloses service processing units that are resident in host servers and capable of downloading a boot image from a cloud-based infrastructure maintaining a library of boot images. In one example of the present disclosure, the point A snapshot is a pristine copy of the boot image as downloaded. The storage system maintaining the point A snapshot may promote the point A snapshot to reset the boot volume without needing the time otherwise required to redownload the boot image. Use of the point A snapshot may reduce risk from the boot image having been compromised by installation of the components such as applications that may be installed and run on the host server.

The storage system may also take and retain another type (point B) snapshot of a boot volume after applying or installing components in the boot volume. For example, the storage processing unit may need to customize a boot volume of its host server according to the hardware, e.g., storage devices and network interfaces that are part of or connected to the host server, and according to the applications to be run on the host server. The storage system may take the point B snapshot after writing and installing component files across the file system but before the computing system, e.g., the host server, has booted from the boot volume. The point B snapshot may be the point to which the storage system rolls back the boot volume when installation of the components involved does not require any reboots. For example, a storage system may roll back a boot volume to a point B snapshot upon seeing a host server reboot, and then the storage system may communicate with a cloud-based service to identify any changes that may be needed to the boot volume.

The storage system may take and retain yet another (point C) snapshot of a boot volume after the computing system, e.g., the host server, reboots using the boot volume. The point C snapshot may, thus, include any changes that the computing system, e.g., the host server, makes to the boot volume when booting up and installing components from the boot volume. If installation of components in the boot volume requires a reboot of the host server, the storage system can roll back to the point C snapshot to avoid an infinite loop of reboots, e.g., to avoid repeatedly rebooting to point B, any changes to the boot volume being completed before the point C snapshot is taken.

Once the storage system has taken the last snapshot (e.g., either a point B or C snapshot, depending on whether a reboot is expected), the storage system can detect and identify the component that caused the reboot. The storage system, upon detection of a host reboot, can promote the snapshot, returning the computing system to its earliest ready-to-use state.

The storage system may take a new point A snapshot when using a new base image for a new operating system or an updated version of the operating system. The storage system can apply components after taking the new point A snapshot and then take another point B snapshot and possibly another point C snapshot, for example a snapshot B' and a snapshot C' that may be maintained along with the prior point B and C snapshots until the prior point B and C snapshots are no longer needed. When the storage system detects a host reboot, the storage system can promote snapshot B' or C' to be the boot volume, instead of promoting the old B or C snapshot.

FIG. 1 is a block diagram including a storage platform 100 in accordance with one example of the present disclosure. Storage platform 100 includes one or more host servers 110-1 to 110-N, which are sometimes generically referred to herein as host server(s) 110. Each host server 110 may be a conventional computer or other computing system including a central processing unit (CPU), memory, and interfaces for connections to internal or external devices. FIG. 1 shows host servers 110-1 to 110-N having respective service or storage processing units (SPUs) 120-1 to 120-N, which are sometimes generically referred to herein as SPU(s) 120. SPUs 120-1 to 120-N may be respectively installed in host servers 110-1 to 110-N, e.g., as daughterboards attached to the motherboards of servers. More generally, storage platform 100 may include one or more host servers 110, with each server 110 hosting one or more SPUs 120. A minimum configuration may include a single host server 110 in which one or more SPUs 120 resides. To improve redundancy, storage platform 100 may be a cluster storage system using at least two host servers 110 and at least two SPUs 120, but more generally, a limitless number of different configurations are possible containing any number of host servers 110 and any number of SPUs 120. In general, storage platform 100 is scalable by adding more SPUs 120 with associated backend storage.

Each SPU 120 generally includes a host interface 122, communication interfaces 124, a storage interface 128, and a processing system 130. Host interface 122 provides communications between the SPU 120 and its host server 110. For example, each SPU 120 may be installed and fully resident in the chassis of an associated host server 110, and each SPU 120 may be a card, e.g., a PCI-e card, or printed circuit board with a connector or contacts that plug into a slot in a standard peripheral interface, e.g., a PCI bus in host server 110, and host interface 122 includes circuitry that complies with the protocols of the host server bus.

Communication interfaces 124 in an SPU 120 provide communications with other SPUs 120 and to other network connected devices. Multiple SPUs 120, e.g., SPUs 120-1 to 120-N in FIG. 1, may be interconnected using high speed data links 125, e.g., one or more parallel 10, 25, 50, 100 or more Gbps Ethernet links, to form a dedicated data network for a pod or cluster of SPUs 120 in storage platform 100. Data links 125 may particularly form a high-speed data network that directly interconnects the SPUs 120 in the pod or cluster, and the data network may be independent of a private network 160 of the enterprise. Communication interfaces 124 may also allow each SPU 120 to communicate with user devices 162 and 164 on private network 160 and communicate with a cloud-based management infrastructure 180 through private network 160, a firewall 161, and a public network 170, e.g., the Internet. An SPU 120 may particularly be able to communicate with cloud-based management infrastructure 180 even if its host server 110 is not fully booted up.

Processing system 130 in an SPU 120 includes one or more microprocessors or CPUs 132 and memory 134 that the SPU 120 employs to manage backend storage and provide storage services. Processing system 130 may particularly implement an I/O processor 142 that processes storage service requests such as read and write requests from storage clients. In accordance with an aspect of the present disclosure, processing system 130 further implements a management module 141 that can communicate with cloud-based management infrastructure 180 or with other SPUs 120 during a setup process that creates and configures virtual volumes, e.g., a virtual boot volume, that the SPU 120 owns or maintains. In accordance with an aspect of the present disclosure, management module 141 may download an OS image to a virtual boot volume, add components to the boot volume, and automatically take or promote snapshots of boot volumes when specific conditions arise or at a specific set of milestones in the configuration and use of the boot volume. Management module 141 may also operate during subsequent reboots of the host server or for automated update, management, or maintenance procedures. All or a portion of management module 141 may be part of a driver or device OS for SPU 120 that SPU 120 runs when powering up.

Each of SPU 120-1 to 120-N controls respective backend storage 150-1 to 150-N, sometimes generically referred to herein as backend or persistent storage 150. Storage interface 128 in each SPU 120 includes circuitry and connectors for attachment to backend storage 150. Backend storage 150 may employ, for example, hard disk drives, solid state drives, or other nonvolatile/persistent storage devices or media in which data may be physically stored, and backend storage 150 particularly may have a redundant array of independent disks (RAID) 5 or 6 configuration for performance and redundancy.

Each SPU 120 may employ communication interfaces 124 and communication links 168 to connect to a network, e.g., to local or private network 160 and through network 160 and firewall 161 to public or wide area network 170. In some implementations of storage platform 100, storage clients, e.g., applications 112 running on a server 110, may request storage service through an SPU 120 resident in the host 110. In an example implementation, an application 112 running in the host server or in a network-connected user device 162 or 164, may send a storage service request, e.g., a read or write request targeting a virtual volume, to its associated server 110, and the server 110 communicates the storage service request to an SPU 120 resident in the server 110. The I/O processor 142 in the resident SPU 120 may receive the storage service request and provide the request storage service or may forward the storage service request through data network 125 to another SPU 120, e.g., to the SPU 120 that owns a volume targeted by the storage service request. In general, storage clients execute at least one application 112 that requires storage services that storage platform 100 provides. FIG. 1 further shows that private network 160 may provide a connection through firewall 161 to public network 170, so that user devices 162 and 164, servers 110, and SPUs 120 may remotely communicate, for example, with cloud-based management infrastructure 180.

Cloud-based management infrastructure 180 may include a computer or server that is remotely located from servers 110 and user devices 162 and 164, and management infrastructure 180 provides an automated service 182 for management of storage platform 100 to thereby reduce the burden of storage management on an enterprise using storage platform 100. Management service 182 thus allows an enterprise to offload the burden of storage setup and management to an automated process that cloud-based management 180 and the SPUs 120 provide. Cloud-based management service 182 may particularly be used to configure SPUs 120 in a pod or cluster in storage platform 100, to monitor the performance of storage platform 100, or to provide data analysis services. Management service 182, during a setup process, may particularly determine an allocation of storage volumes to meet the needs of an enterprise, distribute the allocated volumes to SPUs 120-1 to 120-N, and create a recipe for SPUs 120 to execute to place storage platform 100 to the desired working configuration such as illustrated in FIG. 1.

FIG. 1 illustrates storage platform 100 after a setup process. As mentioned above, each SPU 120, after being set up, may provide storage services to storage clients via virtual volumes or logical unit numbers (LUNs). FIG. 1 particularly shows SPU 120-1 provides storage services relating to a boot volume BV1 for host server 110-1 and one or more other virtual volumes V1, and SPU 120-N provides storage services relating to a boot volume BVN for host server 110-N and one or more other virtual volumes VN. SPU 120-1 is sometimes referred to as "owning" virtual volumes BV1 and V1 in that SPU 120-1 is normally responsible for fulfilling I/O requests that are directed at any of volumes BV1 and V1. Similarly, SPU 120-N owns virtual volumes BVN and VN in that SPU 120-N is normally responsible for executing I/O requests that are directed at any of volumes BVN and VN.

Each SPU 120 generally owns only one boot volume, and boot volumes BV1 to BVN are "unshared" virtual volumes that are used only by host server 110-1 to 120-N, respectively. In accordance with an aspect of the present disclosure, each SPU 120 may maintain multiple snapshots of its boot volume, the snapshots being captured at specific milestones during the configuration of storage platform 100. SPU 120-1 particularly maintains snapshots S1A, S1B, and S1C of the boot volume BV1 for host server 110-1, and SPU 120-N maintains a set of snapshots SNA, SNB, and SNC of boot volume BVN for its host server 120-N. Snapshots S1A and SNA are sometimes referred to herein as point A snapshots, Snapshots S1B and SNB are sometimes referred to herein as point B snapshots, and Snapshots S1C and SNC are sometimes referred to herein as point C snapshots.

FIG. 1 illustrates a state of storage platform 100 that may be achieved after virtual volumes BV1, V1, BVN, and VN have been provisioned and servers 110-1 to 110-N have successfully booted, which resulted in the capture of snapshots S1A, S1B, S1C, SNA, SNB, and SNC. SPUs 120-1 to 120-N with cloud-based management service 182 can perform a setup process for storage platform 100 to create the desired virtual volumes including boot volumes BV1 to BVN and other virtual volumes V1 to VN having the sizes and characteristics that may be customized for the enterprise, and operating systems with the necessary components in boot volumes BV1 to BVN. For example, an enterprise having storage needs may purchase and connect hardware including servers 110-1 to 110-N, SPUs 120-1 to 120-N, and backend storage 150-1 to 150-N for a desired number of storage nodes, and then a setup process can provision virtual volumes BV1 to BVN and V1 to VN, configure SPUs 120-1 to 120-N, and populate boot volumes BV1 to BVN with the OS components.

The setup process may include informing cloud-based management service 182 of the characteristics of hardware in a storage platform and the storage requirements of the user of the storage platform. Based on the hardware and storage requirements, the user or cloud-based management service 182 can select one or more images from a library 190 that cloud-based management infrastructure 180 maintains. For setup of storage platform 100 of FIG. 1, for example, an expert or non-expert administrator with a user device 164 may employ an application, e.g., an Internet browser, to contact cloud-based management service 182, and cloud-based management service 182 may present the user with a user interface 165 through which the user may provide basic hardware information such as identifying the servers 110-1 to 110-N or SPUs 120-1 to 120-N to be used in storage platform 100, identifying the storage capacities of backend storage 150-1 to 150-N, and identifying which (if any) operating systems the storage platform should provide for servers 110-1 to 110-N. Cloud-based management service 182 may also be able to contact SPUs 120-1 to 120-N (or contact one specific SPU 120) using communication links 168 to determine or confirm some or all the hardware information, instead of requiring a human administrator to enter all the information. The storage needs of the enterprise may be similarly determined through an administrator interacting with user interface 165 for the cloud-based management service 182. The administrator may indicate what storage clients or applications 112 will be consuming storage services and indicate or select the types of storage policies that the enterprise desires for storage platform 100.

Cloud-based management infrastructure 180 may store user data 184 for storage platform 100 and then use image library 190 to select or construct (with or without customization) one or more images to fit the hardware information and storage needs of the user. Images may particularly contain provisioning information 192 for the virtual volumes BV1 to BVN and V1 to VN, base operating system images 194 for boot volumes BV1 to BVN, and components 196 of boot volumes BV1 to BVN.

Component images 196 in one example of the present disclosure are "script or configuration" files that may have a standardized format such as VAML configuration files, Python scripts, PowerShell scripts or Shell scripts and may be versioned like machine images to make clear in each machine image what has changed for individual components. Component images may be placed in strategic locations for them to be picked up by an installation program such as Cloud-Init, VMware first boot, or Windows Unattended Installation. Component images that an SPU 120 used in a storage platform may be from cloud-based management service 182 or may be authored by the user, for example using authoring capabilities that the user interface 165 of management services 182 may provide. The needed components for specific systems may be complex and an expert may be required to author a component image. This complexity, however, only applies to the authors of components, not consumers of images or components 196. In some cases, an enterprise may employ an expert that can author suitable components for their storage platform 100, which may be added to image library 190 in cloud-based infrastructure 180. In some other cases, an enterprise may not employ an expert but may instead rely on the expertise of the providers of cloud-based infrastructure 180 and the image library 190 that cloud-based infrastructure 180 provides.

Image library 190 may include component images 196 that cover a variety of popular storage situations. For example, component images 196 may include the needed scripts (components) to setup VMware or Kubernetes. Other component images 196 may mark a recipe for a complete storage system or a recipe that would install specific components such as a monitoring agent, a Web server, a database server, or antivirus code in the boot volume. Component images 196 are generally operating system dependent and generally need to be placed in specific locations in the boot volume. When authoring a component image, the author may select OS dependence or placement.

SPUs 120-1 to 120-N can receive from cloud-based management infrastructure 180 provisioning information 192, OS images 194, and component images 196 that are selected or tailored for storage platform 100 and can use the received images to configure storage platform 100, populate boot volumes BV1 to BVN, and create one or more storage nodes within storage platform 100.

Figure 2:
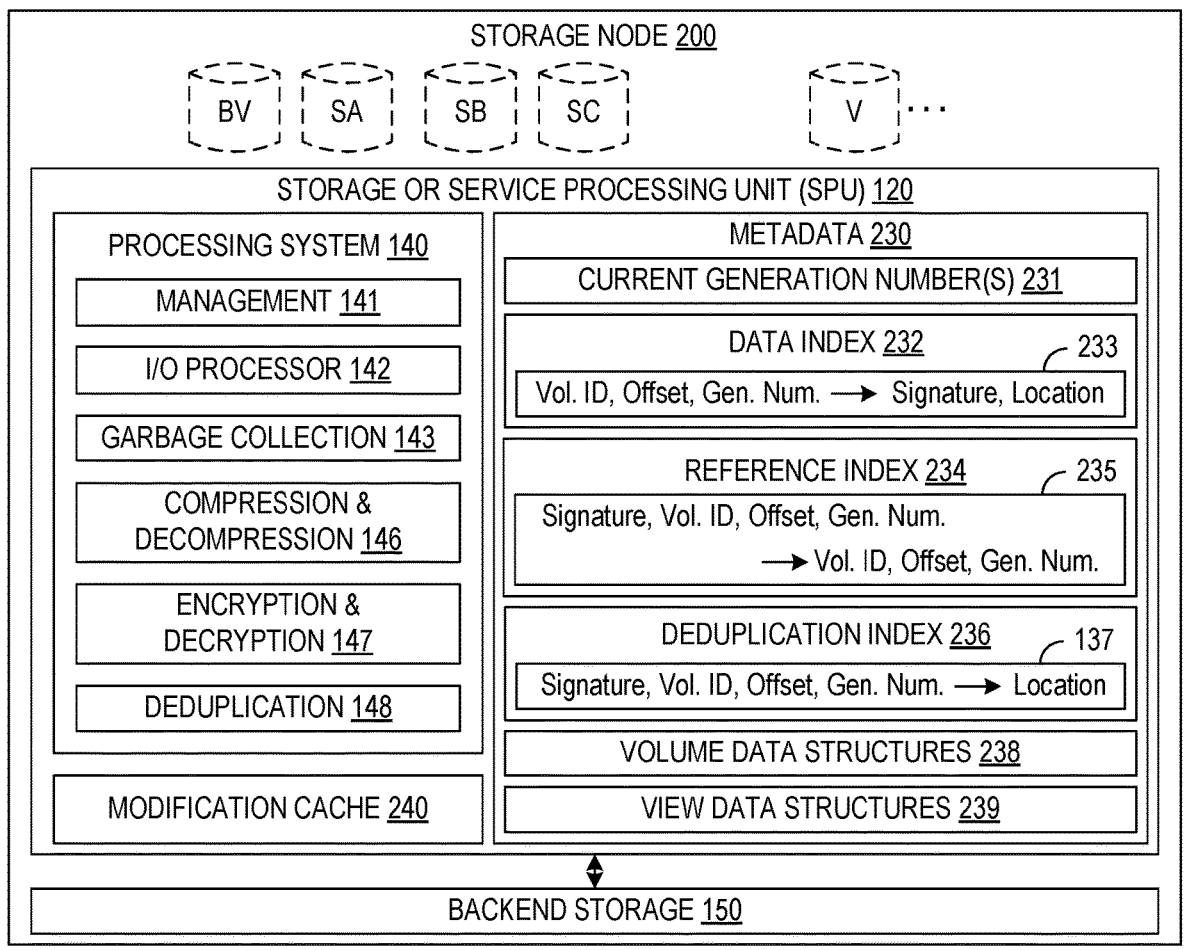
FIG. 2 is a block diagram of a storage node in accordance with an example of the present disclosure.

FIG. 2 is a block diagram illustrating a storage node 200 for a cluster storage system in accordance with another example of the present disclosure. Storage node 200 may be implemented in a computer such as a server (e.g., host server 110 of FIG. 1) and may use backend storage 150 to provide storage services to one or more storage clients (e.g., applications 112 of FIG. 1). The storage clients may access storage node 200 through any suitable communication system, e.g., through a public network such as the Internet, a private network such as a local area network, or a non-network connection such as a SCSI connection to name a few.

SPU 120 in storage node 200 provides an interface that exposes a boot volume BV and other virtual volumes V to storage clients for storage service requests such as reading of pages or blocks of data of virtual volumes BV and V. Each virtual volume BV or V may logically include a set of pages that may be distinguished from each other using addresses or offsets within the virtual volume BV or V. A page size used in a virtual volume BV or V may be the same as or different from a page size used in backend storage 150. Volumes BV and V are virtual volumes in that, although the pages of the volume may be logically sequential in virtual volumes BV and V, pages of a virtual volume BV or V do not correspond to specific sequential physical storage locations and each page of data in a virtual volume may be physically stored at any location in backend storage 150. Storage node 200 uses metadata 230 to track the locations pages of virtual volumes BV and V in backend storage 150. Additionally, instead of immediately overwriting old data in backend storage 150 when receiving write requests targeting a virtual volume BV or V, storage node 200 may respond to each write request by assigning a generation number to the write request and writing incoming data in backend storage 150 at a new physical location in backend storage 150, and storage node 200 may retain older versions of data until garbage collection module 143 determines that the old data is not needed. In particular, the old data that is not needed for reads from the base virtual volume may still be needed for any snapshots that may exist. If the same page or offset in any of virtual volumes is written to multiple times, multiple different versions of the page or offset may remain stored in different physical locations in backend storage 150, and the different versions may be distinguished from each other using the distinct generation numbers that storage node 200 assigned to the data when the data was written.

Each virtual volume BV or V may independently have zero, one, or more snapshots that storage node 200 maintains. In the example of FIG. 2, storage node 200 maintains snapshots SA, SB, and SC of boot volume BV. Each snapshot reflects the state that the corresponding virtual volume had at a time corresponding to the snapshot. In the current example, storage node 200 does not need to read old data and save the old data elsewhere in backend storage 150 when taking a snapshot because storage node 200 only overwrites old data after garbage collection module 143 determines that the old data is unneeded or invalid. Accordingly, storage node 200 may nearly instantaneously take a snapshot because a snapshot operation only requires that SPU 120 assign a generation number to the snapshot and update metadata, i.e., create a view data structure 239 in metadata 230, so that garbage collection module 143 subsequently retains the data needed for the snapshot as described in more detail below.

Most storage services for a page or offset in a virtual volume BV or V only need the newest page version, e.g., the version with the newest generation number. A snapshot SA, SB, or SC of a virtual volume BV generally needs the version of each page which has the highest generation number in a range between a generation number at the creation of the base virtual volume BV and a generation number given to the snapshot SA, SB, or SC at the creation of the snapshot. Page versions that do not correspond to any virtual volume or any snapshot are not needed, and garbage collection module 143 in SPU 120 may perform scheduled or triggered garbage collection processes to remove unneeded pages and free or reclaim storage space in backend storage 150, e.g., when the garbage collection process changes the status of physical pages in backend storage 150 from used to unused.

SPU 120 of storage node 200 may include a processing system 140, as described above, including one or more microprocessors, microcontrollers, and coprocessors with interface hardware for: communication with a host, e.g., a host server 110 in which SPU 120 is installed; communication with other storage systems, e.g., other SPUs 120 forming a storage cluster; and controlling or accessing backend storage 150. Processing system 140 may further include volatile or non-volatile memory (memory 134 in FIG. 1) that may store programming, e.g., machine instructions implementing modules 141, 142, 143, 146, 147, and 148 for management, I/O processing, garbage collection, and other services such as data compression and decompression or data deduplication. Memory of processing system 140 may also store metadata 230 that SPU 120 maintains and uses when providing storage services. Some further details of example hardware for a storage processing unit are described in International Pub. No. WO 2021/174063 A1, entitled "Cloud Defined Storage," which is hereby incorporated by reference in its entirety.

SPU 120, using processing system 140 and suitable software or firmware, implements storage services that storage clients can directly use and storage functions that are transparent to storage clients. For example, I/O processor 142, which is a module that performs operations such as read and write processes in response to read and write requests, may be part of the interface exposing base virtual volumes BV and V and possibly exposing snapshots SA, SB, and SC to its host server or storage clients. On the other hand, management module 141, garbage collection module 143, compression and decompression module 146, encryption and decryption module 147, and deduplication module 148 may perform functions that are transparent to the host server or storage clients. In general, SPU 120 may implement management module 141, I/O processor 142, garbage collection module 143, compression and decompression module 146, encryption and decryption module 147, and deduplication module 148, for example, using separate or dedicated hardware or shared portions of processing system 140 or may use software or firmware that the same microprocessor or microcontroller or different microprocessors of microcontrollers in SPU 120 execute.

I/O processor 142 performs data operations such as write operations storing data and read operations retrieving data in backend storage 150 that logically correspond to blocks or pages in virtual volumes BV and V. I/O processor 142 uses metadata 230, particularly databases or indexes 232, 234, and 236, to track where blocks or pages of virtual volumes BV and V or snapshots SA, SB, and SC may be found in backend storage 150. I/O processor 142 may also maintain one or more current generation numbers 231 for base virtual volumes BV and V. In one example, current generation number(s) 231 is a single global generation number that is used for all storage, e.g., all virtual volumes BV and V, that SPU 120 maintains. In another example, SPU 120 maintains multiple current generation numbers 231 respectively for the base virtual volumes BV and V. When SPU 120 receives a request for one or more specific types of operation targeting a specified volume BV or V, I/O processor 142 may assign the current value of a generation number 231 for that volume BV or V to the request, change the current value of the generation number 231 for that volume BV or V, and leave the current generation numbers 231 for other base virtual volumes unchanged. More specifically, SPU 120 may assign to each write or other operation changing any volume BV or V a generation number corresponding to the value of the current generation number 231 for that volume BV or V at the time that SPU 120 performs the write or other operation. The value of each current generation number 231 may be updated to the next value in a sequence, e.g., incremented by one, before or after each time the current generation number is used to tag an operation.

Garbage collection module 143 detects and releases portions of storage in backend storage 150 that was storing data for one or more of base virtual volumes BV or V or snapshots SA, SB, or SC but that now stores data that is invalid, i.e., no longer needed, for any of volumes BV or V or snapshots S. Garbage collection module 143 may perform garbage collection as a background process that is periodically performed or performed in response to specific events. In some examples of the present disclosure, garbage collection module 143 checks metadata 230 for each stored page and determines whether any generation number associated with the stored page falls in any of the required ranges of base virtual volumes BV or V or snapshots SA, SB, or SC. If a stored page is associated with a generation number in a required range, garbage collection module 143 leaves the page untouched, i.e., retains the data. If not, garbage collection module 143 deems the page as garbage, reclaims the page in backend storage 150 to make the page available for storage of new data, and updates metadata 230 accordingly.

Compression and decompression module 146 may compress data for writing to backend storage 150 and decompress data retrieved from backend storage 150. Using data compression and decompression, SPU 120 can thus reduce the storage capacity that backend storage 150 requires to support all base virtual volumes BV and V and snapshots SA, SB, and SC. Encryption and decryption module 147 may encrypt data for secure storage and decrypt encrypted data, e.g., for read processes. Deduplication module 148 can improve storage efficiency by detecting duplicate data patterns already stored in backend storage 150 and preventing the writing of duplicate data in multiple locations in backend storage 150.

I/O processor 142, garbage collection module 143, compression and decompression module 146, encryption and decryption module 147, and deduplication module 148 share or maintain metadata 230, e.g., in a non-volatile portion of the memory in SPU 120. For example, I/O processor 142 may use data index 232 during write operations to record a mapping between offsets in base virtual volumes BV and V and physical storage locations in backend storage 150, and I/O processor 142 may also use the mapping that data index 232 provides during a read operation to identify where a page of any base virtual volume BV or V or snapshot SA, SB, or SC is in backend storage 150.

SPU 120 maintains data index 232 by adding an entry 233 to data index 232 each time a write process or other storage service process changes the content of a base virtual volume BV or V. Data index 232 is generally used to identify where data of the virtual volumes may be found in backend storage 150. Data index 232 may be any type of database but in the illustrated embodiment is a key-value store containing key-value entries or pairs 233. The key in each key-value pair 233 includes an identifier of a base volume and an offset within the base volume and includes a generation number of an operation that wrote to the offset within the base volume. The value in each key-value pair 233 includes the location in backend storage 150 storing the data corresponding to the generation number from the key and includes a deduplication signature for the data at the location in backend storage 150.

SPU 120 may further maintain data index 232, reference index 234 and deduplication index 236 for deduplication and garbage collection processes. Reference index 234 may be any type of database but in the illustrated example reference index 234 is a key-value store including key-value entries or pairs 235. The key in each key-value pair 235 includes a deduplication signature for data of a write, an identifier of a virtual storage location of the data, and a generation number for the write, and the value in each key-value pair 235 includes an identifier of a virtual storage location and a generation number for an "initial" or first write of the same data pattern. In one implementation, each identifier of a virtual storage location includes a volume ID identifying the virtual volume V and an offset to a page in the virtual volume V. A combination of the data signature, the volume ID and offset, and the generation number of the initial write of the data can be used as a unique identifier for a data pattern available in backend storage 150 of storage node 200. International Pub. No. WO 2021/150576 A1, entitled "Primary Storage with Deduplication," which is hereby incorporated by reference, further describes some examples of deduplication processes and systems.

Storage node 200 may also maintain and employ volume data structures 238 and view data structures 239 in metadata 230 when providing storage services. In one example shown in FIG. 3, volume data structures 238 include base volume entries 310 respectively corresponding to base virtual volumes BV and V and snapshot volume entries 320 corresponding to snapshot volumes SA, SB, and SC. As illustrated, each base volume data entry 310 or snapshot volume data entry 320 includes a volume name field 312 containing a volume name, e.g., an identifier of the base virtual volume or the snapshot volume, and one or more pointer fields 314 containing pointers to associated "view families" in view data structures 239. Given a name of a base virtual volume or snapshot volume, SPU 120 may use volume data structure 238 to identify which view families in view data structures 239 apply to the volume. In an alternative example, volume data structure entries 310 and 320 are not required and entries or portions of view data structures 239 may be identified using the contents of fields in view data structures 239.

Figure 3:
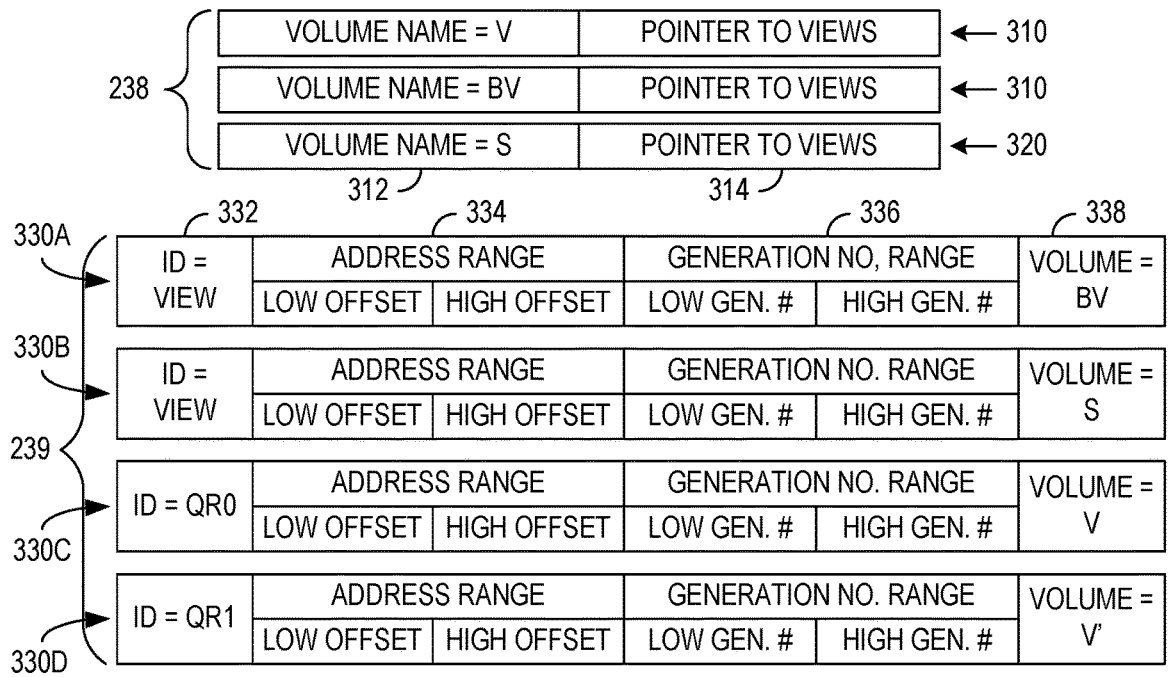
FIG. 3 illustrates example structures for metadata associated with volumes in the storage node.

View data structures 239, in the example of FIG. 3, include one or more view family per base virtual volume with each view family for a virtual volume managing an address range of the base virtual volume. For example, a base virtual volume having TB of storage may have ten view families, a first view family managing the 0 to 1 TB address range, a second view family managing the 1 to 2 TB address range, up to a tenth view family managing the 9 to 10 TB address range. Each view family may include one or more views 330A, 330B, 330C, and 330D, which are generically referred to herein as views 330. View 330A in FIG. 3 is a data structure representing a dynamic view for the view family's address range in the associated base volume. Each view family may also include one or more views 330B, each for a static view that represents the view family's address range in a snapshot S of the associated base virtual volume. Each view family may further include one or more views 330C and 330D for query ranges in the view family's address range.

Each view data structure 330, in the example of FIG. 3, has a view ID field 332 containing a value that may indicate its view family or query range, an address range field 334 containing a value indicating an offset range (e.g., low offset to high offset) within the virtual volume, a generation number range field 336 containing a value indicating a generation number range (e.g., from a lower generation number to a higher generation number), and a volume name field 338 containing a value that may identify a virtual volume, e.g., a base virtual volume or a snapshot. For a dynamic view 330A of a base virtual volume, the low generation number may be the generation number of when the base virtual volume (or the dynamic view itself) was created, and the high generation number may be set as "0" to indicate the current generation number (e.g., the largest generation number). Hereafter, "creation generation number" of a metadata structure refers to the generation number when the metadata structure is created or when a command caused the creation of the metadata structure is received. For a static view 330B of a snapshot, the low generation number may be the creation generation number of base volume (or the corresponding dynamic view), while the high generation number is the creation generation number of the snapshot volume.

Each view data structure 330C or 330D for a query range has a view ID field 332 containing a value that identifies the query range, an address range field 334 indicating an offset range, a generation number range field 336 indicating a generation number range, and a volume name field 338 identifying a view family of a base volume to be searched. In one example, a pair of query range entries 330C and 330D may be associated with a copy operation with one query range entry 330C having field values indicating the source of the copy operation and the other query range entry 330D indicating the destination for the copy operation. More particularly, one query range entry 330C may indicate the offset and generation number range and the volume name V of the source volume for the copy operation, and the other query range entry 330D in the pair may indicate the offset and generation number range and the volume name V' of the destination for the copy operation. (In general, the source volume V and destination volume V' may be the same for copying of one range of offsets in the volume to another range of offsets.) A promote operation, for example, that promotes a snapshot SA, SB, or SC to boot volume BV may be performed as a copy operation that copies the snapshot SA, SB, or SC on to the entire address and generation number range of the boot volume BV.

Storage node 200 can nearly instantaneously capture a snapshot S of a base volume BV or V at any time by assigning a generation number to the snapshot S, updating the snapshot data structure 238 and view data structure 239 in metadata 230 to identify the snapshot S and indicate the generation number of the snapshot S. After that, garbage collection module 143 interprets updated data structures 238 and 239 as instructions to preserve data associated with the snapshot S. Similarly, a snapshot can be nearly instantaneously promoted by copying the snapshot SA, SB, or SC on to the entire address and generation number range of the boot volume BV.

Figure 4:
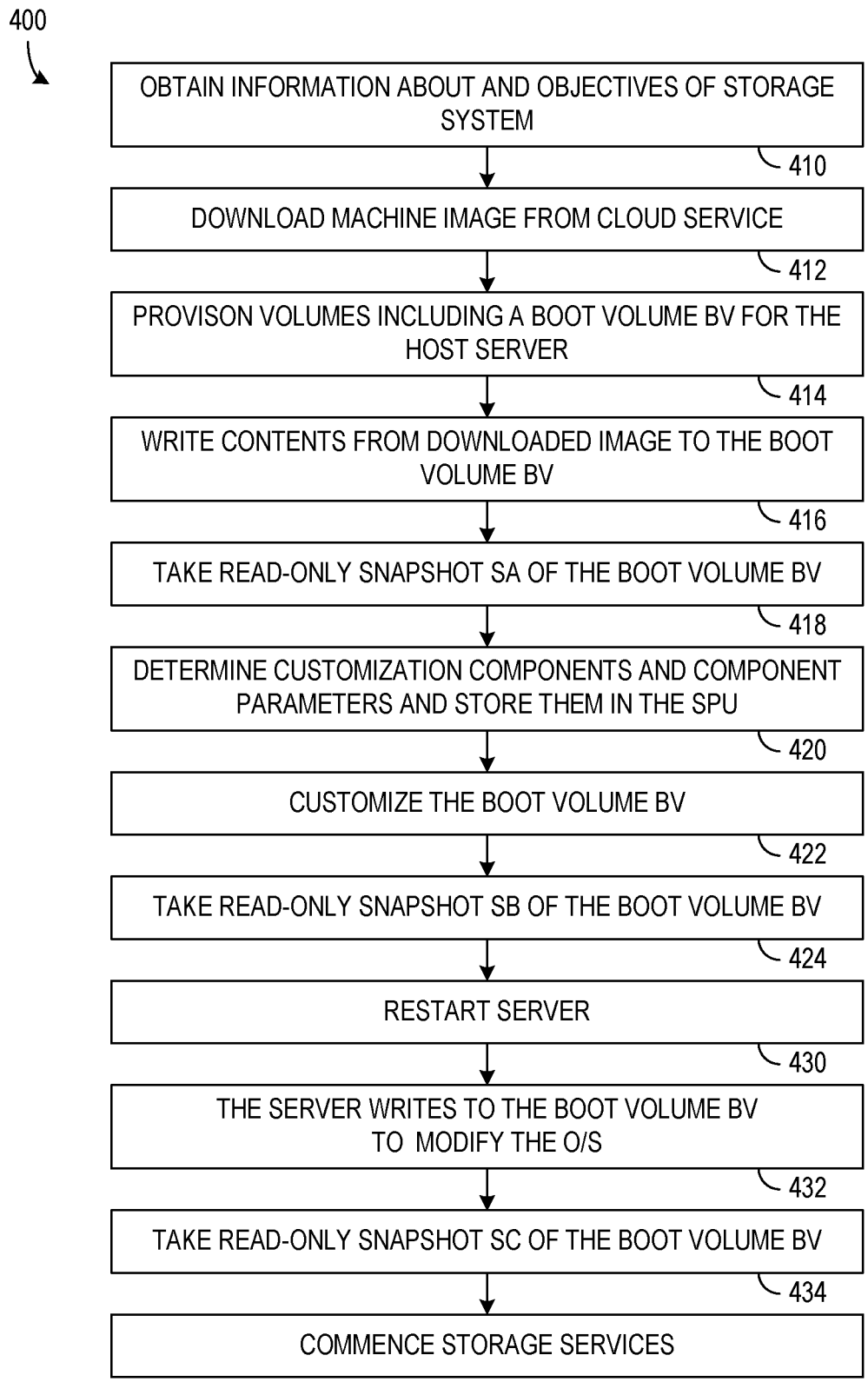
FIG. 4 is a flow diagram illustrating a process for operating a storage system in accordance with an example of the present disclosure that takes and maintains three types of snapshots of a boot volume.

FIG. 4 is a flow diagram of a process 400 for commencing operation of a storage system in accordance with an example of the present disclosure. In the storage system, a storage node 200 or an SPU 120 (or more particularly a management module 141 of the SPU 120) and a cloud-based management service (e.g., cloud-based service 182 of FIG. 2) such as described above may conduct process 400. Process 400 may begin with a block 410 where the cloud-based service obtains information about the storage system hardware and information about the requirements the user has for the storage system. Block 410 may, for example, be conducted through a configuration app 165 described above with reference to FIG. 1. With the obtained information, the cloud-based service can select or construct one or more images for the storage platform, and each storage node or SPU 120 can download, in block 412, an appropriate image from the cloud and provision, in block 414, an empty boot volume BV having characteristics that the image defines. The storage node or SPU in a block 416 then writes a base operating system image downloaded from the cloud into boot volume BV. The SPU 120 or the cloud-based service 180 may choose the downloaded OS image based on user selections or user requirements for storage platform 100, hardware characteristics of the host server 110 or storage node 200, and the desired operating system to be run on the host server 110.

A block 418 may follow block 416 and take a read-only snapshot SA of the boot volume BV. Snapshot SA is a "point A" type snapshot, which indicates snapshot SA contains a "clean" operating system image before any customizations. The downloaded operating system image in boot volume BV may be validated to be a correct specific version (e.g., using checksum) so that boot volume BV contains a "clean" operating system when snapshot SA is taken. In some examples, block 418 includes the SPU 120 tagging snapshot SA as being a point A snapshot, for example, based on the metadata structure of FIG. 3, using a tag in field 332 of the static view 330 for snapshot SA.

In a block 420, the SPU may identify customizations of the components and component parameters that may be needed in the boot volume BV for the particular storage node. The SPU, in a block 422, may apply the identified customizations by writing one or more component image to the boot volume BV. In a block 424, the SPU takes a read-only snapshot SB of the boot volume BV. Snapshot SB is a "point B" type snapshot with point B type referring to snapshot SB containing an operating system image with any customizations that the SPU applies before the server boots from the customized boot volume BV. In some examples, block 424 includes the SPU tagging snapshot SB as being a point B snapshot, for example, based on the metadata structure of FIG. 3, using a tag in field 332 of the static view 330 for snapshot SB.

In a block 430, the SPU causes its host server to boot or reboot and provides the boot volume BV as the boot volume for the host server. While booting, the server, in block 432, may write to the boot volume BV, for example, to modify the operating system or components, e.g., as part of an installation of components from the component images. This installation may require one or more reboot operation. Once installation is complete and the server is ready for normal operation, the SPU, in block 434, takes a read-only snapshot SC of the boot volume BV. Snapshot SC is a "point C" type snapshot, which refers to snapshot SC containing an operating system image after a server reboot. In some cases, the point C snapshot would be the same as the point B snapshot, i.e., the server booting does not alter boot volume BV, so that a separate point C snapshot is not required because the point B and point C snapshots would be the same. When a point C snapshot is taken, block 434 includes the SPU tagging snapshot SC as being a Point C snapshot, for example, based on the metadata structure of FIG. 3, using a tag in field 332 of the static view 330 for snapshot SC.

Process 400 as described above includes an SPU automatically creating snapshots at up to three specific recovery points: point A when the boot volume BV contains a clean base operating system, point B when the boot volume contains the operating system with changes or customizations selected for the storage node, and point C when the boot volume contains the customized operating system with changes made during a boot/installation process. The recovery points may be protected to prevent a user from deleting any of the snapshots SA, SB, and SC. The three types of snapshots may be tagged in some recognizable way so that a recovery operation or an "immutable" boot operation can promote the correct snapshot to return the storage node to a desired one of the three recovery points. In addition to snapshots SA, SB, and SC of boot volume BV, a storage node may also take snapshots of volumes BV and V at other times while providing storage services, for example, to permit a storage node or a storage platform to restore a prior state of the storage node or storage platform other than the state occurring during the boot process.

Figure 5:
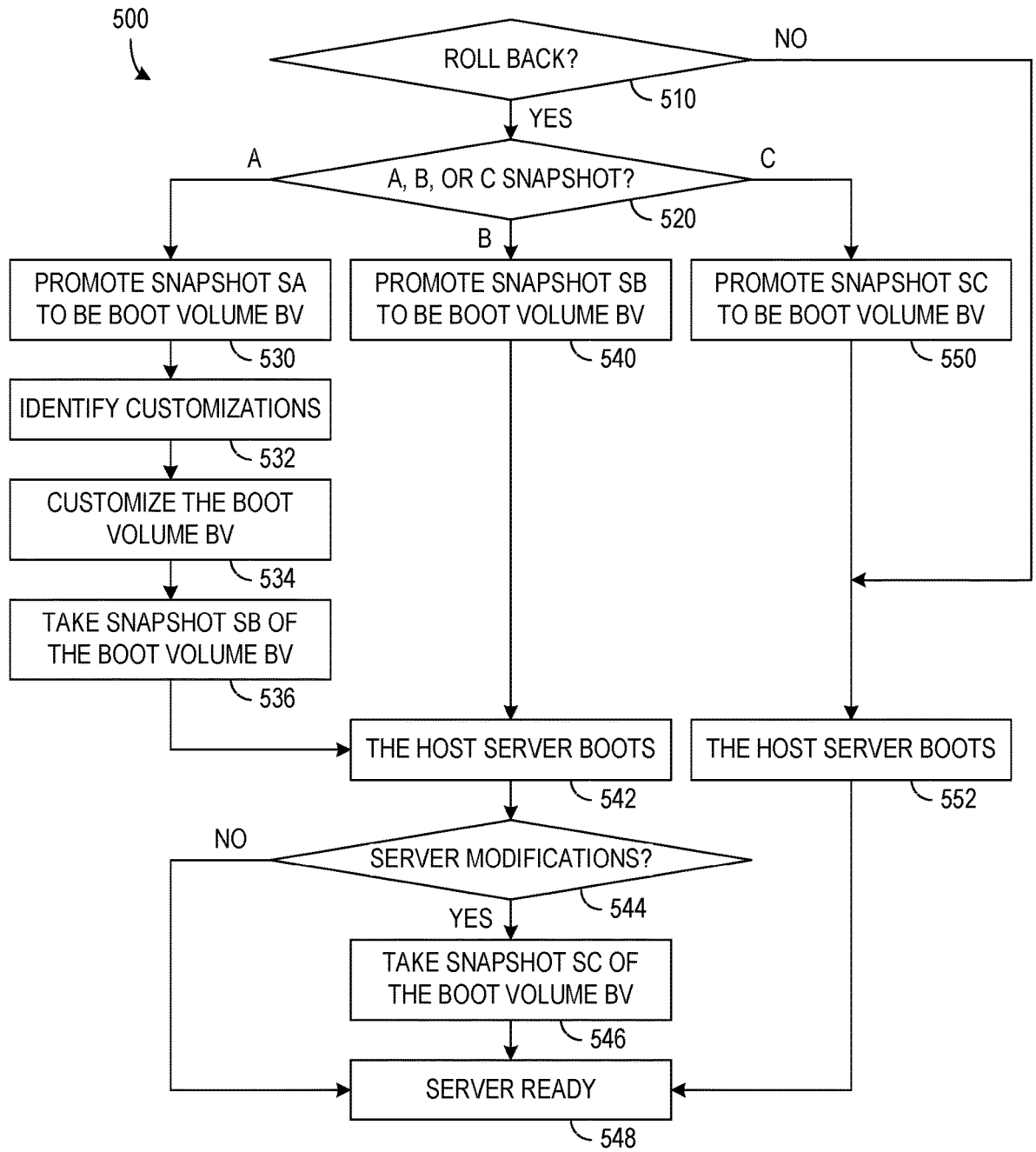
FIG. 5 is a flow diagram illustrating server boot process for boot volumes maintained by a storage system in accordance with an example of the present disclosure.

FIG. 5 is a flow diagram of a process 500 for booting or resetting a host server in a storage platform in accordance with an example of the present disclosure. Process 500 may be used in a storage node of a storage system when resuming normal operations or when resetting a storage system to recover from a failure or to update the storage system. In a decision block 510, process determines whether the boot operation includes a rollback of the boot volume. If not, the host server, in block 542, boots from the current version of the boot volume BV.

A rollback of a storage system or a storage node in the storage system may be needed or desired to recover from a failure, to update the storage system or a storage node in the storage system, or to ensure that a storage system or storage node is starting from a known stable configuration. If a rollback is needed or desired, an SPU could redo process 400 of FIG. 4, which includes initial provisioning, but instead, an SPU in process 500 may roll a boot volume BV back to a snapshot SA, SB, or SC. Process 500 may accordingly reduce external dependencies, e.g., reduce the need to contact a cloud-based service, and may also increase speed of a reset of a storage node by rolling back the boot volume BV for the storage node to one of the available read-only snapshots SA, SB, or SC of the boot volume BV and then rebooting the host server from the rolled back boot volume BV. If decision block 510 determines a rollback is needed or desired, process 500 moves from decision block 510 to a decision block 520, and decision block 520 determines which type of snapshot (point A, point B, or point C) is used for the rollback.

When rolling back or recovering a storage platform, the user may pick a point in time for recovery of a boot volume, and decision block 620 may choose point A, point B, or point C snapshot according to the user's pick. Alternatively, the roll back point A, B, or C may be chosen based on configuration of the storage node to perform "immutable" reboots. For immutable boots, the server always reboots from the same boot volume, e.g., the point B or point C snapshot, so that the server will always boot to a known operable state.

Decision block 520 may select a rollback to the point A snapshot for several different reasons, and in response to any of those reasons, process 500 branches from decision block 520 to block 530. For example, an update of a component may need a rollback to a point A snapshot so that an new component image may be installed. The SPU, in block 530, promotes snapshot SA to be the boot volume BV, thereby returning the boot volume BV to a state containing a clean base operating system for the host server. (The promote operation can be nearly instantaneous in some examples of the present disclosure using the view as described above with reference to FIG. 3.) The SPU, in block 532, can then identify the components or customizations to be applied to the clean OS in boot volume BV, and process 534 may apply the components or customization to the boot volume. If the purpose of the rollback was to update components, the components the SPU identifies when executing block 532 and applies in block 534 are the updated components. If an update of components is not needed, the SPU that owns the boot volume BV may identify and employ, in process block 534, the previously used configuration information to configure a storage node. The previously used configuration information may be used for recovery or roll back of the storage node or an "immutable boot" of the storage node. An immutable boot in this case returns to point A and discards prior customizations or changes that the host server may have made to the boot volume BV during or after the previous boot operations. More generally, the storage node can go back to the state of snapshot SA as long as the associated operating system image has not changed. If the operating system needs to be changed or updated, procedure 400 of FIG. 4 may be used. Since process blocks 530, 532, and 534 apply components to boot volume BV after rolling the boot volume BV back to the clean operating of snapshot SA, a block 536 may take a new point B snapshot SB before rebooting of the host server continues in block 542.

An immutable reboot may also return the boot volume BV to the state of snapshot SA before application of the customizations of the machine image's components and their parameters. The customizations may persist on the SPU in some form, so that there is no external dependency, e.g., no need to contact a cloud-based service, when doing the immutable boot. This customization, however, depends on whether the storage platform is being "updated" with a new image or updated components. For example, a component that installs package 1.0.1 may be updated to install package 1.0.2. This update would require the download of the new components and possibly parameters (if they have changed). After customization, the SPU can take a new snapshot SB (block 536) before the host server reboots (block 542).

Decision step 520 may alternatively choose a rollback of the boot volume BV to the state of snapshot SB. In which case, process 500 branches from decision block 520 to a block 540 where the SPU promotes snapshot SB to be boot volume BV. (The promote operation can be nearly instantaneous in some examples of the present disclosure using the view as described above with reference to FIG. 3.) Selection of snapshot SB may result, for example, if a user directs a storage node to roll back to point SB, if the storage node is configured for immutable reboots from point B, or for recovery if modifications that the host server made since the last reboot are suspect. After the SPU promotes the point B snapshot SB, the host server reboots in block 542.

Block 542 starts the server booting from volume BV, which either corresponds to snapshot SA with newly applied components or to a point B snapshot SB, and the host server, in block 542, may modify the boot volume BV as part of the booting process. If a decision block 544 determines that server modification of the boot volume BV may have occurred during host server boot process 542, the SPU takes (in a block 546) a new point C snapshot before the storage node is ready for normal operation in a block 548.

Decision step 520 may, in yet another alternative, choose a rollback to the state of snapshot SC. In which case, process 500 branches from decision block 520 to a block 550 where the SPU promotes snapshot SC to be boot volume BV. Selection of snapshot SC may result, for example, if a user directs a storage node to roll back to point SC, if the storage node is configured for immutable reboots from point C, or if modifications that the host server made since the last reboot are suspect. After the SPU promotes the point C snapshot SC, the host server reboots in block 552, and the server is ready in block 548 to provide storage services.

The immutable reboot option as described above ensures that a server is running in an expected state in which components and firmware are known and operable. Another variation for ensuring that a server runs at an expected firmware level is to first boot the server into a known or simple operating system, e.g., a Linux operation system, that checks and installs firmware as specified by a firmware baseline every time the server reboots (immutable boot) or when a new machine image is applied or during initial boot. A "firmware baseline" boot image may be based on the baseline specified that is developed for the known or simple operating system. The server can first boot into this image and execute logic to check and install any firmware that is unlike the specified baseline. The server is rebooted after this procedure until the firmware levels are met. At this point the "firmware baseline" image is no longer exported to the host server but the actual operating system is. The server boots into the regular, customized, operating system that the server is supposed to actually boot from.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A method for operating a storage system that includes a server, the method comprising:
storing an operating system image from a trusted source into a boot volume for the server, wherein the server contains a storage processing unit connected to control backend storage and provides the boot volume to the server and wherein storing the operating system image comprises the storage processing unit downloading the operating system image from a cloud-based management service for the storage system;
storing one or more component images from the trusted source in the boot volume, the components being selected according to a desired configuration of the storage system, wherein storing the component images comprises the storage processing unit downloading the component images from a cloud-based management service for the storage system;
after storing the component images, booting the server from the boot volume, the server installing components from the component images while booting;
after booting the server, taking a snapshot of the boot volume; and
configuring the storage system to promote the snapshot to be the boot volume before every reboot of the server, whereby the server always reboots to a known operable state.

2. The method of claim 1, further comprising a user of the storage system contacting the cloud-based management service and selecting the component images based on the desired configuration of the storage system.

3. A method for operating a storage system that includes a server, a backend storage device, and a storage processing unit (SPU) that is connected to the backend storage device and that provides a boot volume to the server, the method including an initialization process comprising:
the SPU writing an operating system image for the server into the boot volume;
the SPU taking a first snapshot of the boot volume containing the operating system image;
after taking the first snapshot, the SPU writing into the boot volume one or more component images selected according to a desired configuration of the storage system;
after writing the components, the SPU taking a second snapshot of the boot volume and the server booting from the boot volume; and
after the server booting, the SPU taking a third snapshot of the boot volume.

4. The method of claim 3, further comprising a reboot process that includes:
selecting a selected snapshot from among the first snapshot, the second snapshot, and the third snapshot; and
the SPU promoting the selected snapshot to be the boot volume for the server.

5. The method of claim 3, further comprising configuring the SPU to promote the third snapshot to be the boot volume for each rebooting of the server, whereby the server reboots to a known operable state.

6. The method of claim 3, further comprising an update process that includes: the SPU promoting the first snapshot to be the boot volume;
   the SPU writing into the boot volume updated components selected according to the desired configuration of the storage system;
   after writing the components, the SPU taking a fourth snapshot of the boot volume and booting the server from the boot volume; and
   after booting the server, the SPU taking a fifth snapshot of the boot volume.

7. The method of claim 3, wherein the component images comprise one or more image of one or more applications being installed for execution by the server.

8. A storage system comprising:
   a server;
   a backend storage device; and
   a storage processing unit connected to the backend storage device, the storage processing unit providing a boot volume to the server, the storage processing unit being configured to execute a first process including:
     writing an operating system image for the server into the boot volume;
   taking a first snapshot of the boot volume containing the operating system image;
   after taking the first snapshot, writing into the boot volume components selected according to a desired configuration of the storage system;
   after writing the components, taking a second snapshot of the boot volume and booting the server from the boot volume; and
   after booting the server, taking a third snapshot of the boot volume.

9. The storage system of claim 8, wherein the storage processing unit performs the first process in response to initialization of the server and in response to updating the operating system.

10. The storage system of claim 8, wherein the storage processing unit is configured to perform a second process for a reboot of the server, the second process comprising:
    selecting a selected snapshot from among the first snapshot, the second snapshot, and the third snapshot; and
    promoting the selected snapshot to be the boot volume for the rebooting of the server.

11. The storage system of claim 8, wherein the storage processing unit is configured to perform a second process for a reboot of the server, the second process comprising promoting the third snapshot to be the boot volume for the rebooting of the server, whereby the server reboots to a known operable state.

12. The storage system of claim 8, wherein the storage processing unit is configured to perform a second process for an update of the components, the second processing comprising:
    promoting the first snapshot to be the boot volume;
    writing into the boot volume updated components selected according to the desired configuration of the storage system;
    after writing the components, taking a fourth snapshot of the boot volume and booting the server from the boot volume; and
    after booting the server, taking a fifth snapshot of the boot volume.

13. The storage system of claim 8, wherein the components comprise one or more image of one or more applications being installed for execution by the server.

* * * * *